(12) United States Patent
Lipson

(10) Patent No.: US 8,557,151 B2
(45) Date of Patent: Oct. 15, 2013

(54) METHOD AND APPARATUS FOR FORMING EXTRUDED STRIPED PLASTIC PRODUCTS WITH VARIATIONS IN WIDTH OF THE STRIPES ALONG THE LENGTH OF THE PRODUCTS AND FOR BLOW MOLDING ARTICLES FORMED FROM SUCH EXTRUDED PARTS

(76) Inventor: Erik Lipson, Philadelphia, PA (US)

( * ) Notice: Subject to any disclaimer, the term of this patent is extended or adjusted under 35 U.S.C. 154(b) by 0 days.

(21) Appl. No.: 13/587,585

(22) Filed: Aug. 16, 2012

(65) Prior Publication Data

US 2012/0305578 A1 Dec. 6, 2012

Related U.S. Application Data

(62) Division of application No. 11/193,599, filed on Jul. 29, 2005, now abandoned.

(60) Provisional application No. 60/592,203, filed on Jul. 29, 2004.

(51) Int. Cl.
*B29C 47/92* (2006.01)

(52) U.S. Cl.
USPC ............... 264/40.7; 264/73; 425/32; D7/500; D7/525; D7/523; 215/382

(58) Field of Classification Search
USPC ............. 264/40.7, 73; 425/132; D7/500, 523, D7/525; 215/382
See application file for complete search history.

(56) References Cited

U.S. PATENT DOCUMENTS

| | | | |
|---|---|---|---|
| 2,174,779 | A | 10/1939 | Delorme |
| 3,097,058 | A | 7/1963 | Branscum |
| 3,257,482 | A * | 6/1966 | Schechter ................... 264/45.1 |
| 3,752,617 | A | 8/1973 | Burlis et al. |
| 4,515,738 | A | 5/1985 | Anders |
| 4,626,187 | A | 12/1986 | Kamada |
| 4,890,994 | A | 1/1990 | Shapler et al. |
| 4,907,957 | A | 3/1990 | Nakagawa et al. |
| 5,004,578 | A | 4/1991 | Eiselen |
| 5,102,588 | A | 4/1992 | Feuerherm |
| 5,156,796 | A | 10/1992 | Nakagawa et al. |
| 5,988,003 | A | 11/1999 | Zuk |
| 6,561,783 | B2 | 5/2003 | Hsu |
| 2005/0017387 | A1 | 1/2005 | Harris |

* cited by examiner

*Primary Examiner* — Yogendra Gupta
*Assistant Examiner* — John Robitaille
(74) *Attorney, Agent, or Firm* — Gifford, Krass, Sprinkle, Anderson & Citkowski, P.C.

(57) ABSTRACT

A multicolored drinking cup is formed by blow molding a multicolored parison. The parison is formed by feeding the outputs of a plurality of controllable rate extruders into an extruding head and varying the flow rates of the extruders in a controlled manner under computer control to produce a parison in which the colors vary in width along the height. The parison is then blow molded to form the container.

5 Claims, 5 Drawing Sheets

METHOD AND APPARATUS FOR FORMING EXTRUDED STRIPED PLASTIC PRODUCTS WITH VARIATIONS IN WIDTH OF THE STRIPES ALONG THE LENGTH OF THE PRODUCTS AND FOR BLOW MOLDING ARTICLES FORMED FROM SUCH EXTRUDED PARTS

CROSS-REFERENCE TO RELATED APPLICATIONS

This application is a divisional of U.S. patent application Ser. No. 11/193,599 filed Jul. 29, 2005, which claims priority of U.S. Provisional Patent Application No. 60/592,203 filed Jul. 29, 2004, which is incorporated herein by reference.

FIELD OF THE INVENTION

This invention relates to a method and apparatus for extruding thermoplastic parts, and particularly tubular parisons, which have stripes along their length, and to blow molding products, and particularly containers, from such parisons.

BACKGROUND OF THE INVENTION

In usual prior art extrusion processes a thermoplastic of a single color is fed to an extrusion head to form a part, which may constitute a parison for use in a subsequent blow molding operation. In certain extrusion processes, plastics of two or more different colors have been simultaneously fed into an extrusion head to form parts with stripes extending in the extrusion direction.

In the normal forming of blow molded products, a parison formed of thermoplastics is extruded and then captured in a mold where it is blown into a shape. This method is used to form containers such as bottles and cups.

SUMMARY OF THE INVENTION

The present invention is directed toward a method of producing plastic products which include stripes of different composition, particularly of different color, and more particularly to such a method which may produce stripes which vary in width along the length of the product. The method and apparatus of the present invention forms extruded tubes having stripes of varying width along their length which may be used as parisons in a subsequent blow molding operation in which a variety of blow molded products may be formed. The present invention further forms blow molding containers, and particularly cups having one closed end and an opposite open end and variations in diameter along the height of the cup. By coordinating these variations in diameter with various striped patterns produced in the parisons, and particularly stripes of varying width, a variety of cups of unique appearance may be formed.

The method of forming extruded products with stripes of a width which varies along the length of the product, in accordance with the present invention, involves use of two or more extruders fed with thermoplastics of differing characteristics, and particularly different colors. The extruders are of a commercially available type which may be electronically controlled to vary the rate of extrusion. In particular, the control signal for the variable rate extruders comprises a digital signal. In the preferred embodiment of the invention, the digital control signals for the two or more extruders are generated by a computer under control of a computer program which generates complementary, coordinated flow rates from the plurality of extruders. For example, if a tubular product is being extruded, having stripes of two colors along its length, when the flow rate from one of the two extruders is increased, in order to increase the width of the stripes it generates at a point along the length of the product, the widths of the stripes of the alternating color and the flow rate from its extruder must be reduced in a complementary manner so that the total flow rate from the two extruders is relatively constant. This is preferably achieved by generating coordinated control signals for the two extruders from a common computer.

In a preferred embodiment of the invention which will be subsequently disclosed in detail, the extrusion head includes a plurality of orifices with materials of different colors and/or different properties being fed to the orifices, so as to produce a striped product. By varying the flow volumes to the extrusion head orifices in timed relationship with one another, the widths of the sections produced by the differing materials may be adjusted so as to provide a product in which there is an axial variation in the pattern. The flow of the different plastics to the spaced orifices on the extruding head can be achieved both by adjusting the flow rates of the extruders which feed the heads, and through the use of piston-actuated accumulators disposed in the flow lines from the extruder to the tooling head, which augment or decrease the flow as their pistons are energized. The computer program can control the piston-actuated accumulators as well as the extruders to vary the flow of each color to achieve stripes of varying widths along the length of the product.

The method and apparatus of the present invention may also be used to extrude plastic products with stripes transverse to the width of the extrusion axis, alone or in combination with axial stripes, by shutting off the flow from one or more extruders of different colors feeding the extrusion head during the extrusion process and increasing the flow from the other head or heads in a complementary manner. In this manner extruded sections could be formed with solely transverse stripes, with transverse stripes at one axial section combined with longitudinal stripes at other sections, or even with combinations of axial and transverse stripes combined across the width of the product and varied along the length.

When the extruded product is a parison for use in a blow molding operation, which produces a part having a variation in diameter along the axis of the part, a variety of aesthetic appearances may be achieved in the resulting products. Any number of different colored plastics can be introduced into the final product in this manner. Three or more colors might be used to achieve a red, white and blue pattern for use on the Fourth of July. For certain axial sections of the product only a single color may be employed, and the extruders producing the other colors turned off.

In a preferred embodiment of the invention the multicolored blow molded containers constitute drinking cups formed as surfaces of revolution with variations in their diameters along the height of the cups. By combining variations in the color pattern with variations in the cup diameters, a variety of unique designs may be achieved. For example, the extruder feeds may be coordinated with the diameter variations of the molded part so that lines of constant width, i.e. pinstripes, are formed on the finished part. By contrast, if constant flow rates from the extruders were used to produce a parison with constant width stripes and a part of varying diameter was molded from the parison, the color lines on the part would have varying widths.

The plastics fed from the plurality of extruders might be of different composition, rather than or as well as different colors. In one embodiment of the invention one extruder feeds high density polyethylene to produce rigid lines in the finished part while another extruder feeds softer, less rigid, low density polyethylene. The resulting product will have rigid strips interleafed with flexible strips. The materials may or may not be colored differently. If plastics of appropriate rigidity are chosen, the resultant part may have an accordion-like structure.

BRIEF DESCRIPTION OF THE DRAWINGS

Other objects, advantages and applications of the present invention will be made apparent by the following detailed description of a preferred embodiment of the invention. The description makes reference to the accompanying drawings in which.

DETAILED DESCRIPTION OF THE PREFERRED EMBODIMENT

Figure 1:
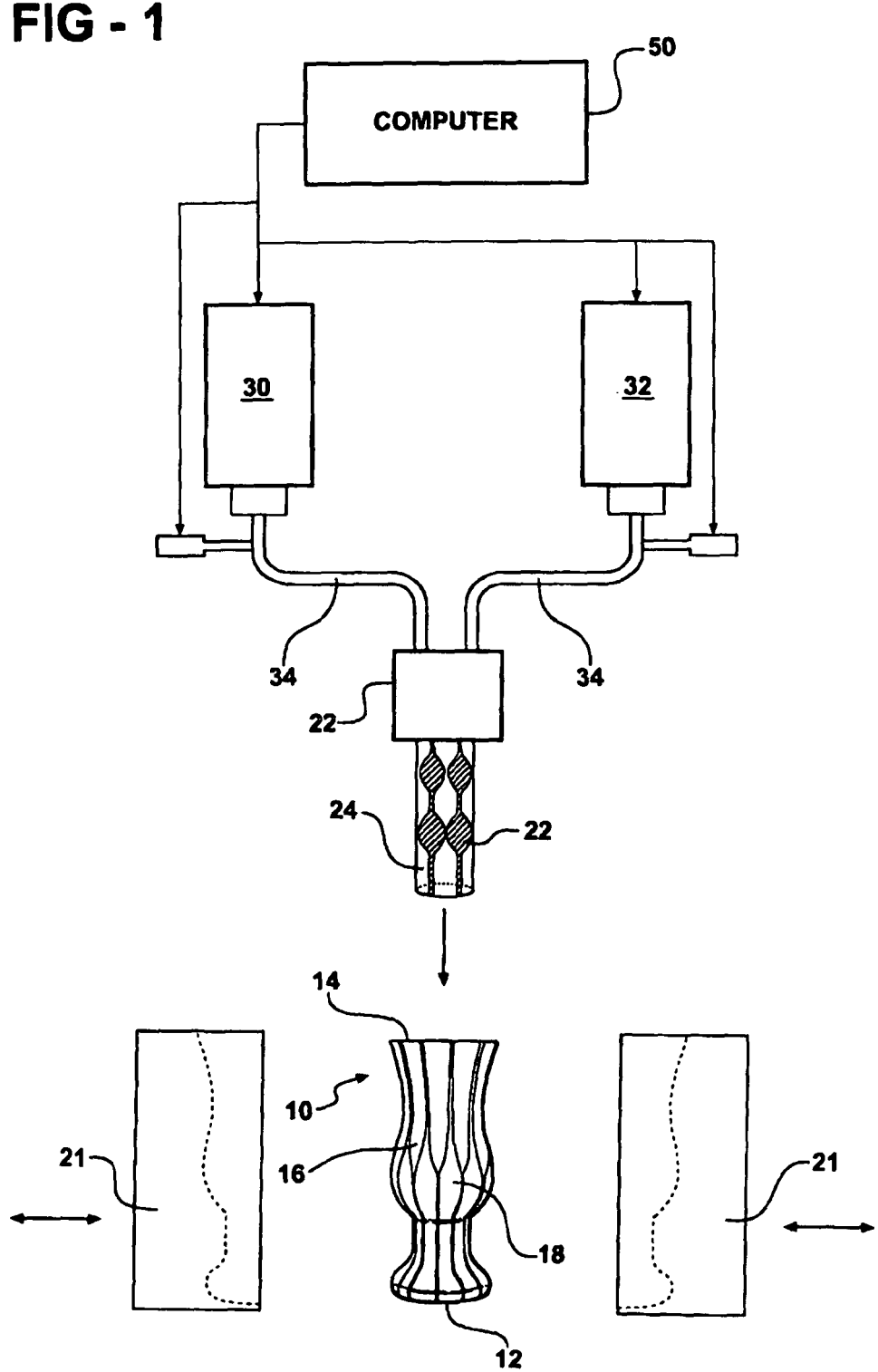
FIG. 1 is a schematic view of apparatus for forming a tubular parison with stripes of varying width along its length which is then blow molded into a container of varying diameter along its height.

FIG. 1 illustrates a system, formed in accordance with the present invention, for producing a blow molded cup, generally indicated at 10. It should be understood that the cup 10 is only exemplary of the infinite variety of products that may be produced by the present invention. The cup has a closed bottom 12 and an open top surrounded by a lip 14. It is preferably formed as a surface of revolution, symmetrical about a central axis. The body of the cup 10, between the bottom 12 and lip 14, is of symmetrical form with a varying diameter along the height. The cup 10 is produced with vertical stripes 16 and 18, which alternate around the circumference of the cup. The stripe 16 is of one color and the stripe 18 is another color. The stripes 16 and 18 vary in width along the height of the cup in a complementary manner; that is, where one of the stripes is relatively wide, the other stripes are relatively narrow.

In order to produce this cup, an extruded tubular parison 20 is first formed and then used in a conventional blow molding machine 21 to form the cup 10. The parison has alternating stripes 22 and 24 which produce the stripes 16 and 18 on the cup 10.

Figure 2:
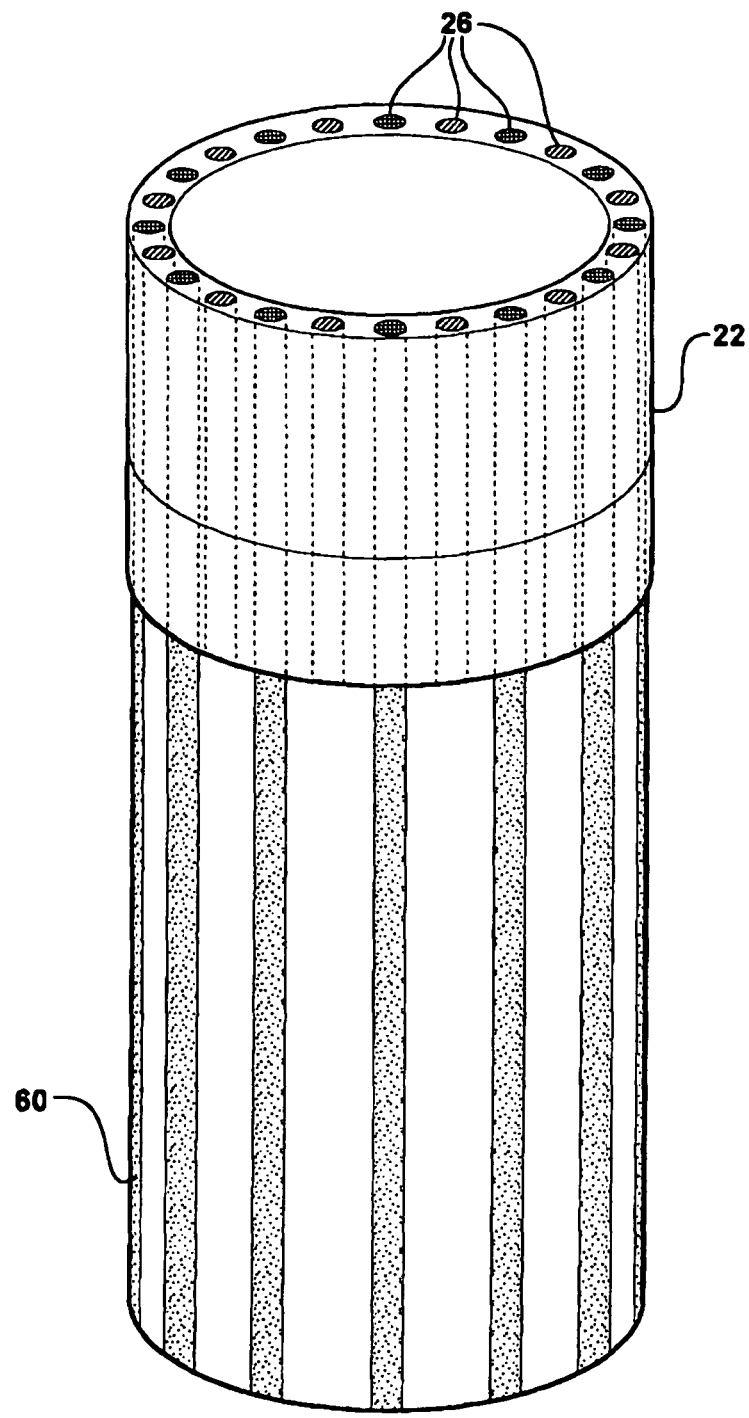
FIG. 2 is a schematic diagram of a multi-orifice cylindrical extrusion head which may be fed by a plurality of extruders to form a striped tubular product useful as a parison.

The tubular parison 20 is formed by an extruding head 22. As shown in FIG. 2, the extruding head has a plurality of circumferentially arranged cavities 26 which depend on the number of stripes to be produced in the parison 20. One cavity produces one stripe. In the embodiment illustrated in FIG. 1 only two colors of stripes are desired in the final product. Accordingly, alternating cavities 26 are fed with different color plastics from a pair of extruders 30 and 32. The extruders include feed lines 34 and 36 respectively which connect to all of the cavities of a single color, with the other feed line connecting to the alternating cavities. Piston type accumulators 38 and 40 are also connected into the feed lines 34 and 36 respectively to vary the flow rates. The pistons may be actuated to feed out plastic or draw in plastic, thus increasing or decreasing the flow rate to the particular cavities 26 which they feed.

Alternatively, instead of feeding plastic from an extruder to a single accumulator and then to a plurality of cavities, separate accumulators could be provided for the feed lines to each cavity so that one or more of the cavity feeds could be individually modified to control the widths of the stripes produced by those cavities. In this arrangement it is desirable to provide shut-off valves, controlled by the computer, upstream of each accumulator, to prevent variations in flow generated by one accumulator from affecting flows to the other cavities fed by the same extruder.

The extruder 30 is fed pellets of one color while the extruder 32 is fed pellets of the other color. Alternatively, the plastics may be of the same color but with different characteristics, such as high density and low density polyethylene. In other embodiments of the invention more than two extruders could be provided to generate products with more than two colors or characteristics of stripes. The extruders 30 and 32 may be of the type manufactured by the Davis-Standard Company of Somerville, N.J. which have electronic control of their flow rates, such as model DS-20. In this model, a digital signal fed to the extruder controls its flow rate.

A computer 50 has output control lines to the two extruders 30 and 32 as well as to the two accumulators 38 and 40. It can send signals to these units to control their flow rates to produce stripes of varying and complementary widths along the length of the parison 20 and thus along the height of the resulting cup 10. The computer 50 is provided with a custom program for each different product to be produced by the system. The program includes means for simultaneously generating complementary control signals to the extruder 30 and its associated accumulator 38 and to the extruder 32 and its associated accumulator 40. The complementary signals insure a uniform total flow output despite variations in the individual color flows.

Figure 3:
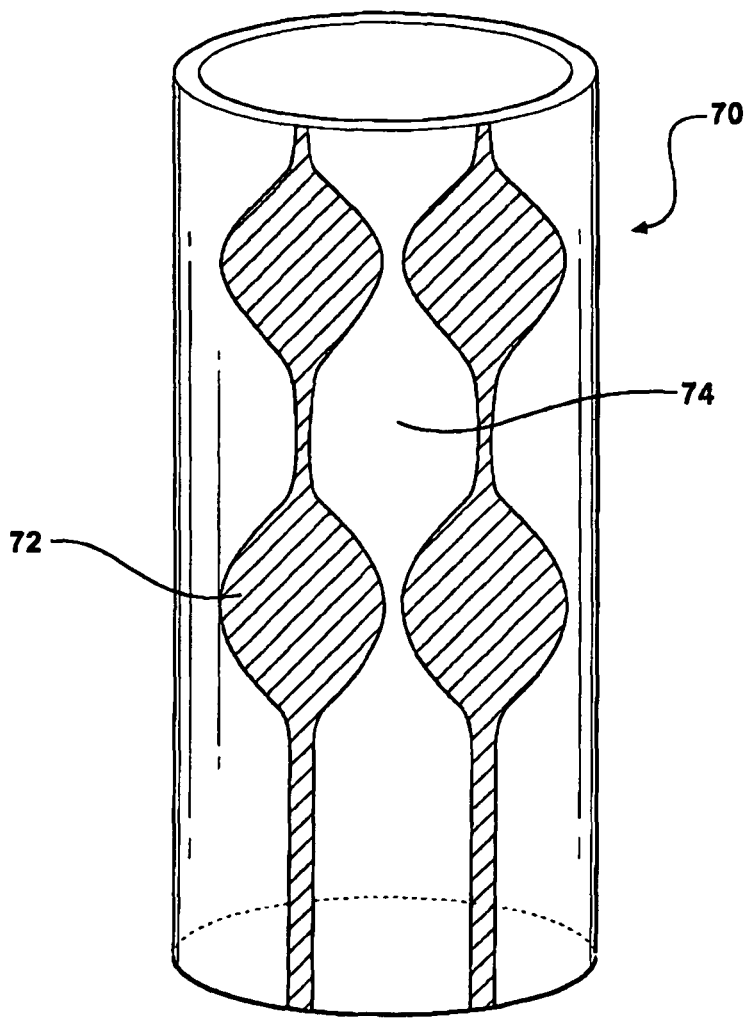
FIG. 3 is a perspective view of a tubular parison having colored stripes of various width along its length as produced by the extruding apparatus of the present invention, prior to being blow molded into a container.
Figure 4A:
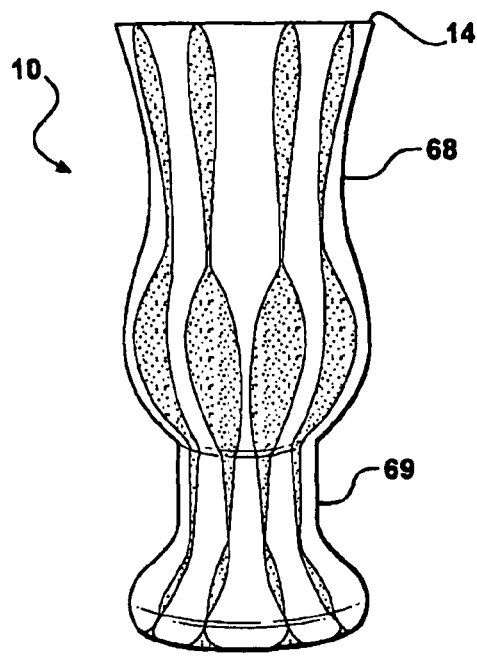
FIGS. 4A-4F illustrate a variety of multicolored drinking cups which may be formed in accordance with the present invention.
Figure 4B:
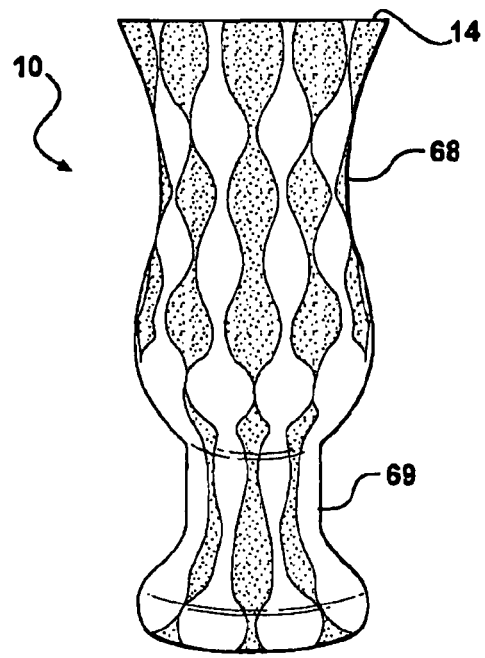
Figure 4C:
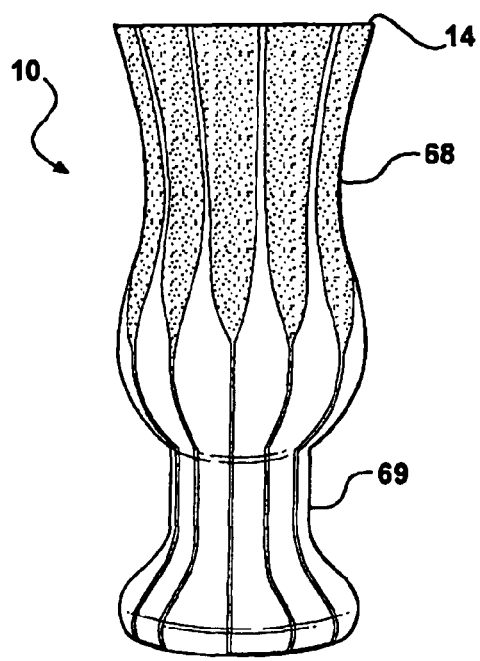
Figure 4D:
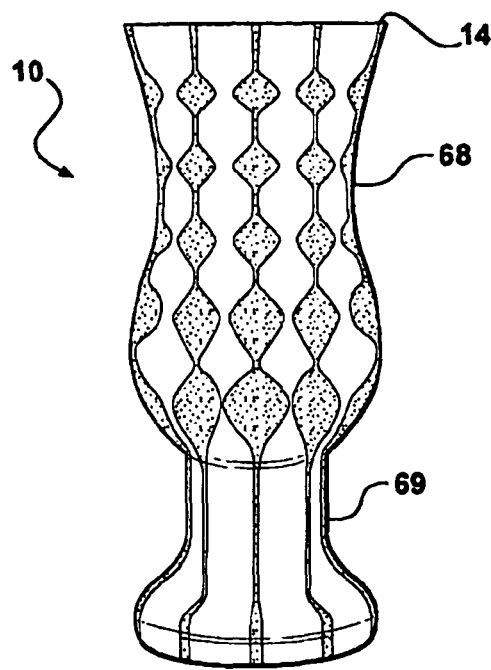
Figure 4E:
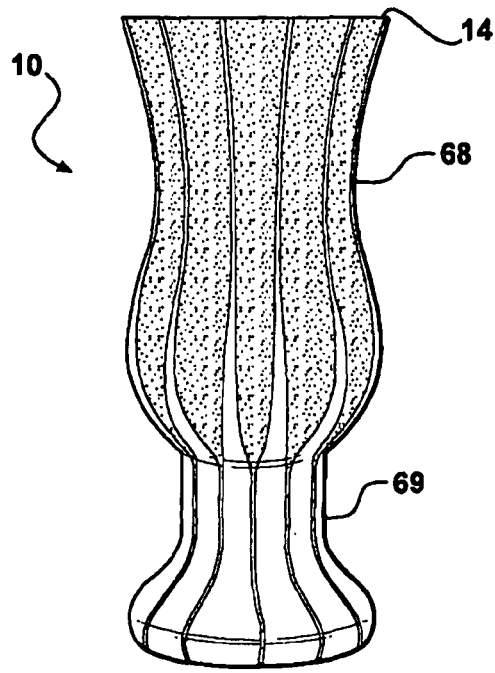
Figure 4F:
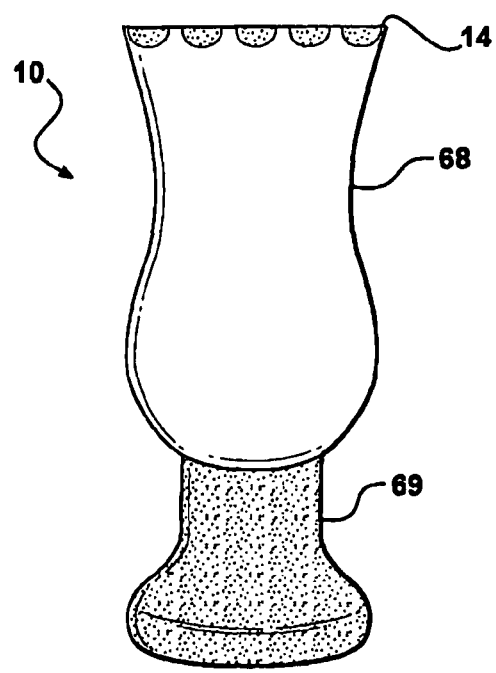

FIG. 2 illustrates an extruding head 22 adapted to generate a tubular product 60, useful as a parison for blow molding, with straight stripes which do not vary along the length of the extruded product. This is produced by providing constant and equal flow rates from a pair of extruders. FIG. 3 illustrates in detail a parison 70 employing stripes of two colors 72 and 74 which are arrayed in alternative fashion around the circumference of the tubular section and which vary in width in a complementary manner along the height of the adjustment parison as a result of computer control of the flows from extruders 30 and 32 during formation of the parison.

FIGS. 4A-4F illustrate six containers, all of the same physical configuration, each with a different color pattern produced in accordance with the method of the present invention. Each of the cups, generally indicated at 10, has a flat base 12 and an open top surrounded by a lip 14. The top of the cup, beneath the lip 14, is characterized by an S shape with a top concave section 68 and a lower convex section 69. At the bottom of the convex section there is a constant diameter section, feeding with a concavity into the base 12. The cups of FIGS. 4A-4E are all formed with alternating stripes. In each case the stripes vary in width along the length of the cup so as to produce a totally different aesthetic impression. The cup of FIG. 4F has a single color body 68, different color base 70 with complementary colors about the lip at 74. This is produced by cutting off the flow from one of the extruders at the appropriate points in the extrusion cycle.

It should be understood that the method and apparatus of the present invention can be made to produce flat plastics as well as tubular plastics and that tubular parisons could be blow molded into any of a wide variety of shapes. Having thus described my invention, I claim:

The invention claimed is:

1. An article of manufacture comprising:

a blow molded plastic container in the form of a surface of revolution having a varying diameter along a height extending between an open top and a closed bottom, the diameter varying to create a succession of convexities and concavities along the height, and the container having multi-colored stripes of varying widths each centered about and extending along the full height of the container.

2. The article of manufacture of claim 1, formed by a method comprising:

extruding a tubular parison employing a plurality of controllable rate extruders feeding different plastics connected to a flow rate control system which controls the feed rates of the extruders in a complementary manner wherein an increase in the flow rate of one of the controllable rate extruders corresponds to a decrease in the flow rate in another of the controllable rate extruders, having their outputs connected to flow passages in an extruding head having the flow passages arranged at equal distances in a circle, with each flow passage being connected to one extruder and adjacent flow passages being connected to other extruders; and blow molding the parison to form said container.

3. An article of manufacture comprising, a blow molded plastic container in the form of a surface of revolution having a varying diameter along a height extending between an open top and a closed bottom and having multi-colored stripes of varying widths each centered about and extending along the full height of the container, said article being formed by a method comprising:

extruding a tubular parison employing a plurality of controllable rate extruders feeding different plastics connected to a flow rate control system which controls the feed rates of the extruders in a complementary manner wherein an increase in the flow rate of one of the controllable rate extruders corresponds to a decrease in the flow rate in another of the controllable rate extruders, having their outputs connected to flow passages in an extruding head having the flow passages arranged at equal distances in a circle, with each flow passage being connected to one extruder and adjacent flow passages being connected to other extruders; and blow molding the parison to form said container.

4. An article of manufacture comprising:

a blow molded plastic container in the form of a surface of revolution having a varying diameter along a height extending between an open top and a closed flat bottom base, the diameter varying to create a succession of convexities and concavities along the height, and the container having multi-colored stripes of varying widths formed in the plastic, each stripe extending along the full height of the container.

5. The article of manufacture of claim 4, formed by a method comprising:

extruding a tubular parison employing a plurality of controllable rate extruders feeding different plastics connected to a flow rate control system which controls the feed rates of the extruders in a complementary manner wherein an increase in the flow rate of one of the controllable rate extruders corresponds to a decrease in the flow rate in another of the controllable rate extruders, having their outputs connected to flow passages in an extruding head having the flow passages arranged at equal distances in a circle, with each flow passage being connected to one extruder and adjacent flow passages being connected to other extruders; and blow molding the parison to form said container.

* * * * *